United States Patent [19]

Nagai et al.

[11] 4,367,269
[45] Jan. 4, 1983

[54] SOLID ELECTROLYTE

[75] Inventors: Ryo Nagai, Nara; Hidehito Obayashi, Tokyo; Akira Gotoh, Suita; Tetsuichi Kudo, Tokyo, all of Japan

[73] Assignee: Hitachi, Ltd., Tokyo, Japan

[21] Appl. No.: 201,766

[22] Filed: Oct. 29, 1980

[30] Foreign Application Priority Data

Oct. 29, 1979 [JP] Japan .............................. 54-138794
Mar. 14, 1980 [JP] Japan .............................. 55-31553

[51] Int. Cl.³ .......................................... H01M 6/18
[52] U.S. Cl. ..................................... 429/191; 429/199
[58] Field of Search ................. 429/191, 30, 33, 199; 204/195 S; 423/409; 252/62.2

[56] References Cited

U.S. PATENT DOCUMENTS

| | | | |
|---|---|---|---|
| 3,824,130 | 7/1974 | Liang | 429/191 X |
| 3,994,747 | 11/1976 | Greatbatch et al. | 429/191 X |
| 4,166,887 | 9/1979 | Mueller et al. | 429/191 |
| 4,186,249 | 1/1980 | Mellors | 429/191 |
| 4,234,554 | 11/1980 | Rabenau et al. | 429/191 X |

FOREIGN PATENT DOCUMENTS

| | | | |
|---|---|---|---|
| 2000898 | 1/1979 | United Kingdom | 429/191 |
| 2024500 | 1/1980 | United Kingdom | 429/191 |
| 532916 | 2/1977 | U.S.S.R. | 429/191 |

Primary Examiner—Anthony Skapars
Attorney, Agent, or Firm—Antonelli, Terry and Wands

[57] ABSTRACT

A lithium-ionic-conductive solid electrolyte consisting of lithium iodide and lithium nitride. It has the feature that the lithium ionic conductivity is higher than in prior-art solid electrolytes, and such feature becomes more remarkable when lithium hydroxide is added.

1 Claim, 3 Drawing Figures

SOLID ELECTROLYTE

BACKGROUND OF THE INVENTION

1. Field of the Invention

This invention relates to a solid electrolyte. More particularly, it relates to a lithium-ionic-conductive solid electrolyte which has a high lithium ionic conductivity even at the normal temperature and which produces especially favorable results when used in a lithium cell, an electrochromic display, etc.

2. Description of the Prior Art

As is well known, electrochemical devices which employ solid electrolytes having the lithium ionic conductance have many merits such as being free from the fear of leakage and providing a long lifetime, and permitting an extraordinarily small and thin structure. Therefore, many uses such as very thin batteries and electrochromic displays are expected of them. Since, however, prior-art solid electrolytes are very low in the lithium ionic conductivity at the normal temperature, they are not extensively employed at present.

Regarding the solid electrolytes exhibiting the lithium ionic conductance, there have been proposed, for example, a lithium cell which employs $LiNaO\cdot 9Al_2O_3$ as a solid electrolyte (Japanese Published Unexamined patent application No. 52-103635) and a solid electrolyte consisting of a sulfate of pyridine and $Li_2SO_4$ (Japanese Published Unexamined patent application No. 53-115694). All such solid electrolytes, however, have the disadvantage as above stated that the lithium ionic conductance is not very great.

Unless the lithium ionic conductance is great, there is, for example, the problem that a high current density is not attained when the solid electrolyte is applied to a lithium cell. Therefore, the lithium-ionic-conductive solid electrolyte needs to have as high a lithium ionic conductivity as possible.

SUMMARY OF THE INVENTION

An object of this invention is to solve the problems of the prior arts and to provide a solid electrolyte which has a high lithium ionic conductivity even at the normal temperature.

In order to accomplish the object, this invention constructs a solid electrolyte out of an iodide of lithium and a nitride of lithium.

DETAILED DESCRIPTION OF THE PREFERRED EMBODIMENTS

Figure 1:
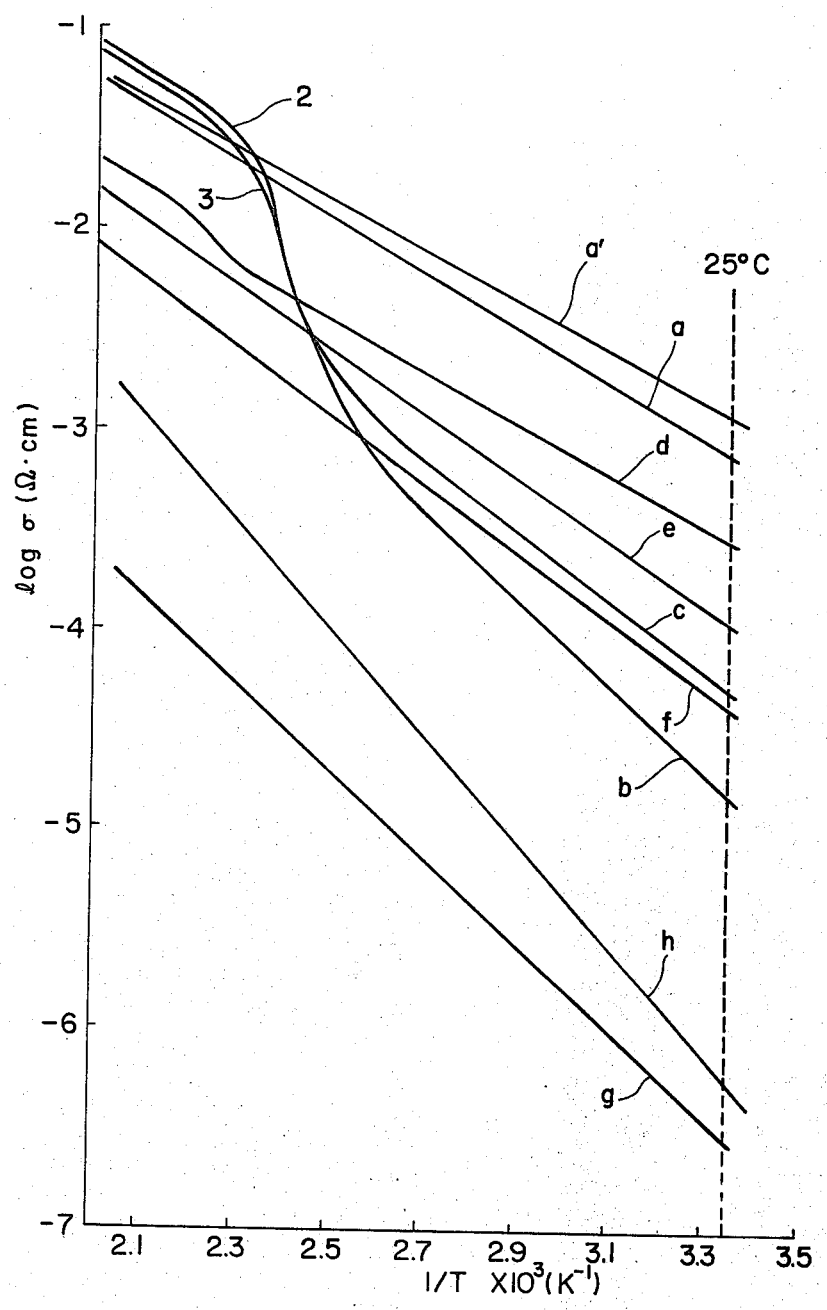
FIGS. 1 and 2 are characteristic diagrams each showing the effect of this invention.

A solid electrolyte of this invention consists of lithium iodide and lithium nitride, and is produced by mixing and heating the starting substances ($Li_3N$ and $LiI$) in an inert gas atmosphere. As compared with prior-art solid electrolytes, it has the two great features that the lithium ionic conductivity is remarkably high and that the dependency of the conductivity on the frequency is very low. In case where the composition of the solid electrolyte according to this invention is represented as a general formula of $x(Li_3N)\cdot 1-x(LiI)$, such features of this invention become very conspicuous when $0.1 \leq x \leq 0.9$, especially favorable results being obtainable.

Table 1 lists results obtained in such a way that, while changing the quantity x of $Li_3N$ in the solid electrolyte, conductivities at 25° C. corresponding to the respective values x were measured. Throughout a range in which x is 0.1–0.9, very high conductivities are exhibited.

TABLE 1

| x | Conductivity $((\Omega \cdot cm)^{-1})$ |
|---|---|
| 0.1 | $1.5 \times 10^{-5}$ |
| 0.3 | $5 \times 10^{-5}$ |
| 0.5 | $3 \times 10^{-4}$ |
| 0.6 | $8 \times 10^{-4}$ |
| 0.7 | $1 \times 10^{-4}$ |
| 0.9 | $1 \times 10^{-5}$ |

In general, the prior-art lithium-ionic-conductive solid electrolytes have the problem that the frequency dependency of the conductivity is great and that the resistivity in the case where direct current flows is high. In contrast, in the solid electrolyte according to this invention, the frequency dependency of the conductivity is extremely low. By way of example, when a resistance value obtained by extrapolating to the frequency infinity at the room temperature and a resistance value at 1 kHz were compared, a slight increase of about 50% was noted. Therefore, the solid electrolyte of this invention is very suitable as a material for use in batteries etc.

As described above, the solid electrolyte according to this invention is formed by heating and reacting predetermined quantities of $Li_3N$ and $LiI$. When the composition of the solid electrolyte produced ($x \leq 0.5$) was examined by the X-ray diffraction, a compound having the cubic lattice ($a = 9.45$ Å) and small quantities of $Li_3N$ and $LiI$ were detected.

The above-mentioned value obtained by the X-ray diffraction agrees well with the value of the cubic lattice ($a = 9.55$ Å) which has been given by H. Sattlegger and H. Hahn; Naturwiss. 51, 534 (1964). It is accordingly considered that the principal component of the solid electrolyte formed by the method is $Li_5NI_2$.

Regarding a case where $x > 0.5$, the composition of each solid electrolyte produced was similarly examined with the X-ray diffraction. Then, a compound having the cubic lattice ($a = 10.37$ Å) and thought to be $Li_7N_2I$ and small quantities of $Li_5NI_2$, $Li_3N$ and $LiI$ were detected. Also the value of this compound having the cubic lattice agrees well with the value indicated by Sattleger et al. ($a = 10.36$ Å).

As one of the prior-art lithium-ionic-conductive solid electrolytes, $Li_3N$-$LiBr$ has been known (P. Herting et al.; Solid State Commu. 30, 601–603, 1979). The conductivity of this electrolyte is approximately $8 \times 10^{-8}$ $(\Omega \cdot cm)^{-1}$, which is only 1/1,000–1/10,000 of the conductivity attained by this invention.

Among the lithium-ionic-conductive solid electrolytes having heretofore been known, $LiI$ containing 40 mol-% of $Al_2O_3$ has been known to exhibit a high conductivity (C. C. Liang; J. Electrochem. Soc., 120, 10, 1289, 1973). However, the conductivity of this material is $1 \times 10^{-5}$ $(\Omega \cdot cm)^{-1}$, and as apparent from Table 1, all the conductivities attained by this invention are greater than the aforesaid value within the range of x from 0.1 to 0.9. Since the conductivity of $LiI$ itself is only approximately $1 \times 10^{-7}$ $(\Omega \cdot cm)^{-1}$, the conductivities attained by this invention are of course much higher than the conductivity of $LiI$ itself.

Hereunder, this invention will be described more in detail in conjunction with examples.

EXAMPLE 1

Li$_3$N and LiI which were sufficiently subjected to vacuum drying at 150° C. were mixed at a mol ratio of 6:4 (x=0.6), and the mixture was baked at 550° C. for 3 hours.

After cooling, the mixture was finely pulverized and was pressed under a pressure of 2 tons/cm to form a green pellet. Thereafter, the green pellet was heated at 350° C. for 1 hour, to form a sintered pellet. All of the mixing, the pulverization and the pressing were conducted in an argon or nitrogen atmosphere.

Silver electrodes were formed by evaporation on both the opposing faces of the pellet thus formed, and the temperature (T: absolute temperature)-dependency of an A.C. conductivity ($\sigma$) at 1 kHz was measured.

A result obtained is shown by a straight line a in FIG. 1.

Regarding the pellet, the conductivity measurement was carried out with the complex impedance method, the temperature dependency of the conductivity at the frequency infinity was evaluated by an extrapolation to the frequency infinity, and a result shown by a straight line a' in FIG. 1 was obtained.

The D.C. resistivity of a solid electrolyte is represented by the sum between an intragranular resistivity and an intergranular resistivity. Regarding the solid electrolyte in the present example (0.6 Li$_3$N.0.4 LiI), the measurement by the complex impedance method was conducted. As a result, the intragranular resistivity was 830 $\Omega$·cm, whereas the intergranular resistivity was 420 $\Omega$·cm, and the total resistivity was only 1.5 times the intragranular resistivity.

As seen from FIG. 1, the difference between the two straight lines a and a' is very small. From this fact, it is understood that the frequency dependency of the conductivity of the pellet is very low. Moreover, the conductivity at 25° C. at 25° C. is on the order of $10^{-3}$ ($\Omega$·cm)$^{-1}$, which is much higher than those of the prior-art solid electrolytes. This material is accordingly recognized to be excellent as a lithium-ionic-conductive solid electrolyte for use at the normal temperature.

A similar measurement result has been reported on Li$_3$N (J. R. Rea et al.; Mat. Res. Bull., 14, 841, 1979), according to which the intergranular resistivity of Li$_3$N is about 10 times the intragranular resistivity. As is well known, the frequency characteristics of the resistivity are determined by the intergranular resistivity, which therefore needs to be reduced to the end of improving the frequency characteristics. In this invention, as described above, the intergranular resistivity is remarkably lower than in the case of Li$_3$N alone. For this reason, the invention presents the very good frequency characteristics of the resistivity.

EXAMPLE 2

Li$_3$N and LiI sufficiently subjected to vacuum drying at 150° C. were mixed at mol ratios of 1:9, 3:7, 5:5, 7:3 and 9:1. By the same treatments as in Example 1, pellets of x(Li$_3$N).1−x(LiI) in which the values x were 0.1, 0.3, 0.5, 0.7 and 0.9 respectively were formed. Similarly to the case of Example 1, the temperature dependencies of A.C. conductivities at 1 kHz were measured.

The characteristics of the respective pellets are shown by curves b, c and d and straight lines e and f in FIG. 1.

For the sake of comparison, the temperature dependency of an A.C. conductivity at 1 kHz, of a pellet which was obtained by pressing by applying a pressure of 2 tons/cm$^2$ to LiI is shown by a straight line g, and the temperature dependency of a conductivity at the frequency infinity, of a pellet of Li$_3$N which was formed by similarly processing is shown by a straight line h.

As apparent from FIG. 1, in the case of x(Li$_3$N).1−x-(LiI), all the conductivities at 25° C. become greater than $10^{-5}$ ($\Omega$·cm)$^{-1}$ within the range of x from 0.1 to 0.9. In both the cases of LiI and Li$_3$N, it was noted that the conductivities are $10^{-6}$–$10^{-7}$ ($\Omega$·cm)$^{-1}$ or less, which are much smaller than in this invention.

Figure 2:
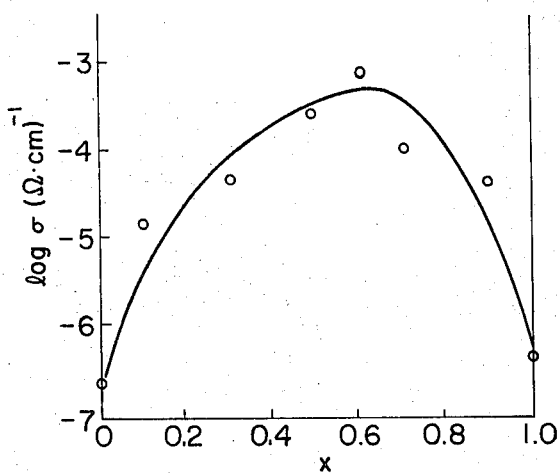

In order to illustrate the effect of this invention more clearly, FIG. 2 shows the dependency of the lithium ionic conductivity at 25° C. on x. It is apparent that all the solid electrolytes according to this invention provide higher conductivities than in the cases of LiI (x=0) and Li$_3$N (x=1.0) alone, and that the invention is very excellent. Especially in the range of x from 0.1 to 0.9, greater conductivities than any value having hitherto been known are exhibited.

As described above, this invention has such very excellent properties that the lithium ionic conductance being much greater than in the prior-art solid electrolytes is exhibited and that the frequency dependency of the lithium ionic conductivity is low.

The excellent characteristics are promoted in such a way that lithium hydroxide (LiOH) is further added to the solid electrolyte having the foregoing composition so that the composition of the solid electrolyte may consist essentially of the three components of lithium nitride, lithium iodide and lithium hydroxide.

The solid electrolyte having such composition is formed by employing lithium nitride, lithium iodide and lithium hydroxide as starting substances, mixing and pulverizing predetermined quantities of the starting substances and heating and baking the pulverized mixture in an inert atmosphere.

When a hydrate of lithium iodide is employed as a starting substance, the water of the hydrate reacts with part of lithium nitride, and lithium hydroxide and ammonia (NH$_3$) are produced. Therefore, the same substance as in the case of using lithium nitride, lithium iodide and lithium hydroxide is formed.

In this regard, lithium iodide has the three sorts of hydrates of monohydrate, dihydrate and trihydrate, and lithium nitride is also liable to change into lithium hydroxide. In order to obtain an electrolyte having a predetermined composition, therefore, the starting substances need to be adjusted with scrupulous care.

The reaction for synthesizing the solid electrolyte according to this invention by the use of these starting substances is susceptible to moisture and oxygen. In order to produce the solid electrolyte having the predetermined composition, therefore, the reaction must be carried out in an inert atmosphere with moisture and oxygen removed satisfactorily.

EXAMPLE 3

After vacuum drying at 150° C. for 10 hours, special-grade lithium iodide to be used as a starting substance was heat-treated at 400° C. for 10 hours in a high-purity nitrogen atmosphere so as to remove a water content, excess iodide etc. and to eliminate deviations in the stoichiometric composition thereof.

Similarly, special-grade lithium hydroxide was sufficiently dried by a heat treatment at 300° C. for 10 hours in a high-purity nitrogen atmosphere.

As lithium nitride, a commercially available article (purity: 98%) was used as it was.

These starting substances were mixed in various proportions, and the mixtures were baked at 550° C. for 3 hours and then cooled. The mixtures were pulverized into fine powder and were pressed by applying pressures of 2 tons/cm². The green pellets were sintered by heating them at 350° C. for 1 hour, to form pellets for a measurement of conductivity.

Needless to say, all of a series of these processing steps were executed in a high-purity nitrogen gas atmosphere in order to avoid influences by moisture and oxygen.

Silver electrodes were disposed by evaporation onto the opposing faces of the pellets thus formed, and A.C. conductivities of 1 kHz at 25° C. were measured. Then, results listed in Table 2 were obtained.

As explained previously, the lithium ionic conductivity of $LiI \cdot Al_2O_3$ (40 mol-% $Al_2O_3$) which is one of the typical lithium-ionic-conductive solid electrolytes of the prior arts has been known to be $1 \times 10^{-5} (\Omega \cdot cm)^{-1}$. As for symbols in a decision column in Table 2, O signifies that the lithium ionic conductivity is greater than $1 \times 10^{-4}$ $(\Omega \cdot cm)^{-1}$, △ signifies that it is $1 \times 10^{-4} - 1 \times 10^{-5}$ $(\Omega \cdot cm)^{-1}$, X signifies that it is $1 \times 10^{-5} - 1 \times 10^{-6}$ $(\Omega \cdot cm)^{-1}$, and ● signifies that it is smaller than $1 \times 10^{-6} (\Omega \cdot cm)^{-1}$. In Table 2, it is understood that solid electrolytes in areas with the marks O and △ have greater lithium ionic conductances than the electrolyte $LiI \cdot Al_2O_3$.

TABLE 2

| No. | Composition (mol - %) | | | Conductivity (25° C.) $(\Omega \cdot cm)^{-1}$ | Decision |
|---|---|---|---|---|---|
| | Li₃N | LiI | LiOH | | |
| 1 | 36 | 35 | 29 | $2.8 \times 10^{-4}$ | O |
| 2 | 20 | 80 | 0 | $1.1 \times 10^{-6}$ | X |
| 3 | 33 | 67 | 0 | $1.5 \times 10^{-5}$ | △ |
| 4 | 50 | 50 | 0 | $2.0 \times 10^{-5}$ | △ |
| 5 | 67 | 33 | 0 | $5.2 \times 10^{-5}$ | △ |
| 6 | 85 | 15 | 0 | $4.0 \times 10^{-5}$ | △ |
| 7 | 95 | 5 | 0 | $3.0 \times 10^{-5}$ | △ |
| 8 | 95 | 0 | 5 | $2.5 \times 10^{-5}$ | △ |
| 9 | 80 | 10 | 10 | $5.5 \times 10^{-5}$ | △ |
| 10 | 47 | 44 | 9 | $5.0 \times 10^{-5}$ | △ |
| 11 | 35 | 55 | 10 | $3.3 \times 10^{-5}$ | △ |
| 12 | 25 | 65 | 10 | $6.5 \times 10^{-6}$ | X |
| 13 | 22 | 68 | 10 | $2.7 \times 10^{-6}$ | X |
| 14 | 15 | 75 | 10 | $4.3 \times 10^{-7}$ | ● |
| 15 | 58 | 29 | 13 | $6.0 \times 10^{-5}$ | △ |
| 16 | 25 | 60 | 15 | $1.3 \times 10^{-5}$ | △ |
| 17 | 82 | 0 | 18 | $2.1 \times 10^{-5}$ | △ |
| 18 | 65 | 15 | 20 | $4.7 \times 10^{-5}$ | △ |
| 19 | 41 | 41 | 18 | $7.4 \times 10^{-5}$ | △ |
| 20 | 20 | 60 | 20 | $1.8 \times 10^{-6}$ | X |
| 21 | 40 | 40 | 20 | $1.2 \times 10^{-4}$ | O |
| 22 | 50 | 25 | 25 | $7.5 \times 10^{-5}$ | △ |
| 23 | 38 | 38 | 24 | $1.7 \times 10^{-4}$ | O |
| 24 | 27 | 48 | 25 | $1.1 \times 10^{-4}$ | O |
| 25 | 10 | 65 | 25 | $2.3 \times 10^{-7}$ | ● |
| 26 | 0 | 79 | 21 | $8.2 \times 10^{-8}$ | ● |
| 27 | 70 | 0 | 30 | $1.5 \times 10^{-5}$ | △ |
| 28 | 51 | 16 | 33 | $8.0 \times 10^{-5}$ | △ |
| 29 | 47 | 25 | 28 | $1.0 \times 10^{-4}$ | O |
| 30 | 31 | 38 | 31 | $2.2 \times 10^{-4}$ | O |
| 31 | 23 | 45 | 32 | $1.9 \times 10^{-5}$ | △ |
| 32 | 20 | 50 | 30 | $3.0 \times 10^{-6}$ | X |
| 33 | 10 | 60 | 30 | $1.0 \times 10^{-7}$ | ● |
| 34 | 0 | 65 | 35 | $1.5 \times 10^{-8}$ | ● |
| 35 | 55 | 5 | 40 | $2.3 \times 10^{-5}$ | △ |
| 36 | 45 | 16 | 39 | $1.3 \times 10^{-4}$ | O |
| 37 | 41 | 21 | 38 | $1.2 \times 10^{-4}$ | O |
| 38 | 25 | 35 | 40 | $1.7 \times 10^{-4}$ | O |
| 39 | 17 | 43 | 40 | $2.1 \times 10^{-6}$ | X |
| 40 | 45 | 10 | 45 | $3.0 \times 10^{-5}$ | △ |
| 41 | 50 | 0 | 50 | $5.8 \times 10^{-6}$ | X |
| 42 | 34 | 18 | 48 | $1.8 \times 10^{-4}$ | O |
| 43 | 23 | 32 | 45 | $1.2 \times 10^{-4}$ | O |
| 44 | 19 | 35 | 46 | $1.5 \times 10^{-5}$ | △ |
| 45 | 17 | 37 | 46 | $3.0 \times 10^{-6}$ | X |
| 46 | 15 | 40 | 45 | $7.3 \times 10^{-7}$ | ● |
| 47 | 0 | 55 | 45 | $9.8 \times 10^{-8}$ | ● |
| 48 | 38 | 10 | 47 | $3.1 \times 10^{-5}$ | △ |
| 49 | 30 | 15 | 55 | $2.5 \times 10^{-5}$ | △ |
| 50 | 25 | 24 | 51 | $1.8 \times 10^{-4}$ | O |
| 51 | 23 | 23 | 54 | $1.1 \times 10^{-4}$ | O |
| 52 | 20 | 25 | 55 | $1.0 \times 10^{-5}$ | △ |
| 53 | 18 | 31 | 51 | $2.1 \times 10^{-6}$ | X |
| 54 | 10 | 35 | 55 | $6.0 \times 10^{-9}$ | ● |
| 55 | 0 | 48 | 52 | $1.0 \times 10^{-7}$ | ● |
| 56 | 0 | 45 | 55 | $9.1 \times 10^{-8}$ | ● |
| 57 | 40 | 0 | 60 | $1.3 \times 10^{-6}$ | X |
| 58 | 30 | 9 | 61 | $1.8 \times 10^{-6}$ | X |
| 59 | 20 | 20 | 60 | $2.4 \times 10^{-6}$ | X |
| 60 | 35 | 0 | 65 | $8.8 \times 10^{-8}$ | ● |
| 61 | 20 | 15 | 65 | $9.5 \times 10^{-8}$ | ● |
| 62 | 10 | 25 | 65 | $3.0 \times 10^{-8}$ | ● |
| 63 | 100 | 0 | 0 | $2.9 \times 10^{-5}$ | △ |
| 64 | 0 | 100 | 0 | $2.7 \times 10^{-7}$ | ● |
| 65 | 0 | 0 | 100 | $7.0 \times 10^{-14}$ | ● |

Figure 3:
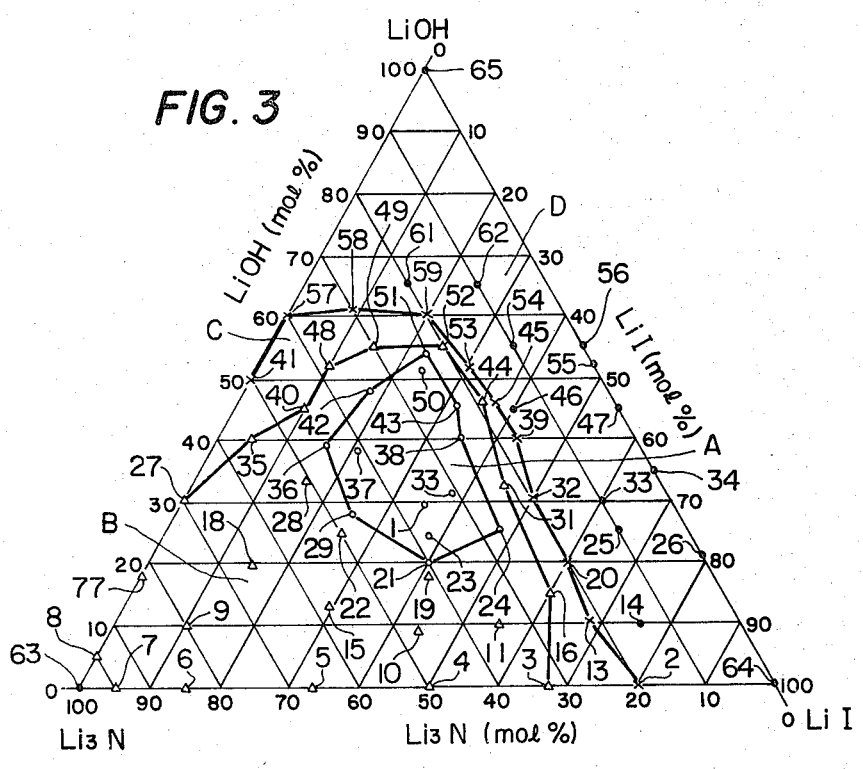
FIG. 3 is a diagram showing a preferable composition range of this invention.

It is FIG. 3 that represents the results of Table 2 as a diagram of the ternary composition of $Li_3N-LiI-LiOH$. Symbols O, △, X and ● in FIG. 3 and numerals affixed thereto correspond to the symbols in the decision column and the numerals in the No. column in Table 2, respectively.

As apparent from FIG. 3 and Table 2, when the ratio among lithium nitride, lithium iodide and lithium hydroxide falls within an area A, the lithium ionic conductivity becomes at least $1 \times 10^{-4}$ $(\Omega \cdot cm)^{-1}$, this being very excellent as the lithium-ionic-conductive solid electrolyte. Especially, the lithium ionic conductivity of the sample (No. 1) in which the mol ratio among lithium nitride, lithium iodide and lithium hydroxide was 36:35:29 reached $2.8 \times 10^{-4}$ $(\Omega \cdot cm)^{-1}$.

In FIG. 3, an area B is a region circumscribed to the area A and indicates a range in which the lithium ionic conductance denoted by the symbol △ is attained. Since, as described before, the symbol △ signifies that the lithium ionic conductivities lie within the range of $1 \times 10^{-4} - 1 \times 10^{-5}$ $(\Omega \cdot cm)^{-1}$, it eventually holds that when the solid electrolyte has any composition within the areas A and B, a lithium ionic conductance higher than in $LiI \cdot Al_2O_3$ being the typical prior-art solid electrolyte is attained.

Areas C and D are regions denoted by the symbols X and ● respectively, in which the lithium ionic conductivities become $1 \times 10^{-5} - 1 \times 10^{-6}$ $(\Omega \cdot cm)^{-1}$ and below $1 \times 10^{-6} (\Omega \cdot cm)^{-1}$ and the lithium ionic conductance is inferior to that of the prior-art solid electrolyte.

Accordingly, it is particularly favorable that the solid electrolyte according to this invention has the composition falling within the area A or B.

Since, however, this invention is more excellent than the prior-art solid electrolytes in points other than the lithium ionic conductivity as described below, even compositions lying within the area C or D can be put into practical use.

The first of the features is that the decomposition voltage is higher than in the prior arts.

As is well known, the single crystal of lithium nitride has the very high lithium ionic conductance of $1.2 \times 10^{-3}$ $(\Omega \cdot cm)^{-1}$ at 27° C. in the direction of the C-axis (U. V. Alpen et al.; Applied Physics Letter, 30, 12, 621 (1977)). Lithium nitride, however, cannot be used for a lithium cell requiring a high energy density because its decomposition voltage is as very low as 0.445 V.

On the other hand, the decomposition voltage in this invention is very high as understood from the fact that it is at least 2.6 V in $0.36Li_3N.0.35LiI.0.29LiOH$ (No. 1) which, at the same time exhibiting the highest lithium ionic conductivity. The invention is very advantageous for use in the lithium cell which requires the high energy density.

The second feature of this invention is that the manufacture is extremely easy.

By way of example, $\beta$-$Al_2O_3$ is one of the most known cationic conductors. In order to synthesize this substance by the hot press method, it is necessary to set a temperature above approximately 1,500° C. In order to form a sintered compact by only heating and baking, the substance must be heated to approximately 1,850° C.

Heat treatments at such high temperatures are very inconvenient in order to perform the mass production. In contrast, in forming the solid electrolyte according to this invention, low-temperature heating at approximately 400°–600°C. suffices, so that the mass production is easy.

As set forth above, this invention has not only the effect that the lithium ionic conductivity is remarkably great, but also the important merits that the decomposition voltage is much higher than in the prior-art solid electrolytes and that the solid electrolyte can be readily fabricated at low temperatures.

Therefore, not only with the composition with which the lithium ionic conductivity becomes greater than in the prior-art solid electrolytes, but also when the lithium ionic conductivity becomes somewhat smaller than in the prior arts, this invention is applicable to many uses including the lithium owing to the other merits.

What is claimed is:

1. A lithium-ionic-conductive solid electrolyte comprising lithium nitride and at least one of lithium iodide and lithium hydroxide, wherein the composition of said solid electrolyte falls within an area A surrounded by line segments connecting a point 24 (27, 48, 25) with a point 38 (25, 35, 40), said point 38 with a point 43 (23, 32, 45), said point 43 with a point 51 (23, 23, 54), said point 51 with a point 42 (34, 18, 48), said point 42 with a point 36 (45, 16, 39), said point 46 with a point 29 (47, 25, 28), said point 29 with a point 21 (40, 40, 20) and said point 21 with said point 24 or an area B surrounded by line segments connecting a point 3 (33, 67, 0) with a point 16 (25, 60, 15), said point 16 with a point 31 (23, 45, 32), said point 31 with a point 44 (19, 35, 46), said point 44 with a point 52 (20, 25, 55), said point 52 with a point 49 (30, 15, 55), said point 49 with a point 48 (38, 10, 47), said point 48 with a point 40 (45, 10, 45), said point 40 with a point 35 (55, 5, 40), said point 35 with a point 27 (70, 0, 30), said point 27 with a point 17 (82, 0, 18), said point 17 with a point 8 (95, 0, 5), said point 8 with a point 7 (95, 5, 0), said point 7 with a point 6 (85, 15, 0), said point 6 with a point 5 (67, 33, 0), said point 5 with a point 4 (50, 50, 0) and said point 4 with said point 3 in the diagram showing the ternary composition of $Li_3N$-$LiI$-$LiOH$ of FIG. 3.

* * * * *